Figure 1:
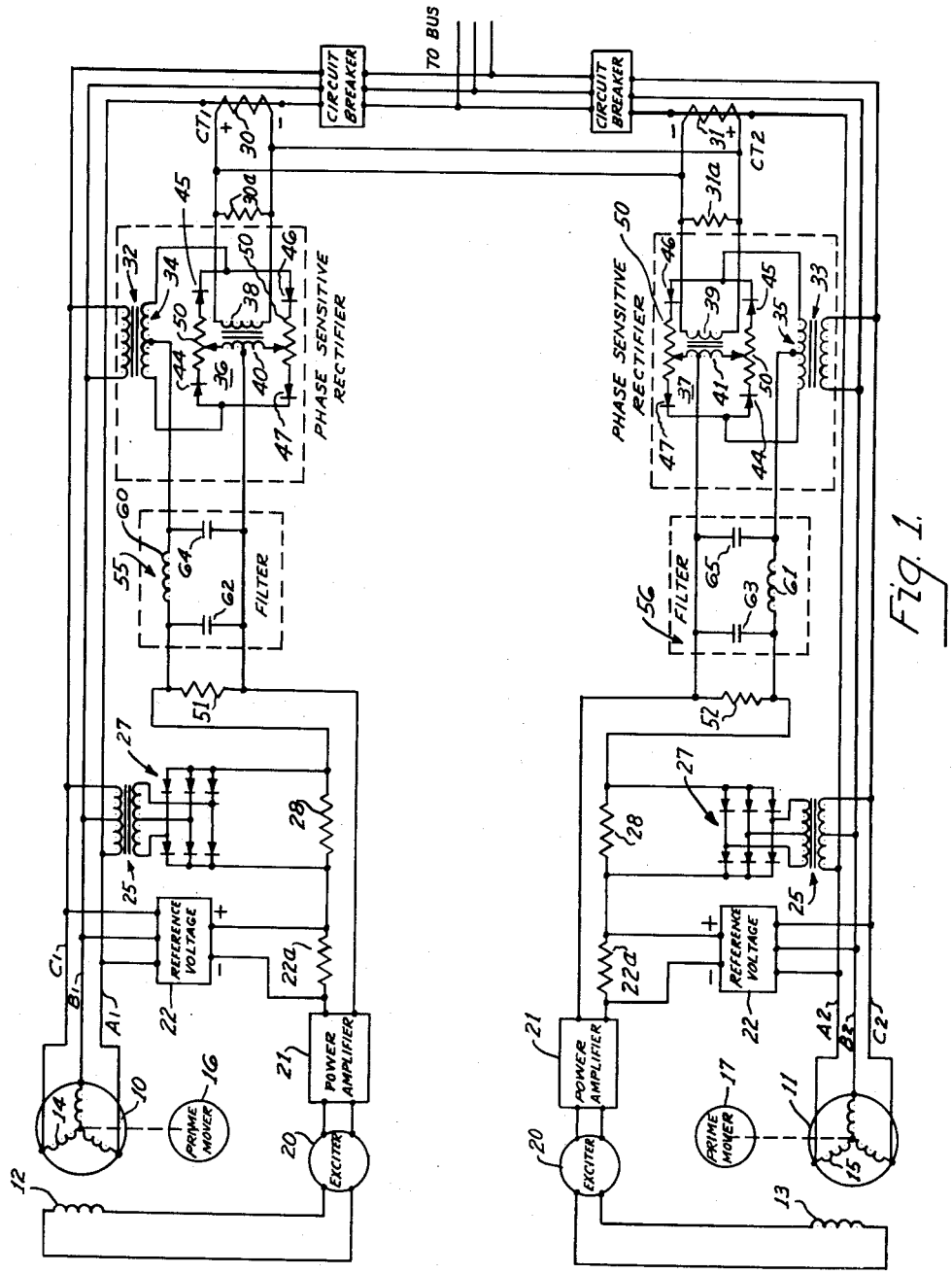

INVENTOR.
HERMANN A. KAHLE
BY Bosworth, Sessions,
Herrstrom & Knowles
ATTORNEYS.

United States Patent Office 2,972,058
Patented Feb. 14, 1961

2,972,058

ALTERNATING CURRENT GENERATOR SYSTEMS

Hermann A. Kahle, Solon, Ohio, assignor to Jack & Heintz, Inc., Cleveland, Ohio, a corporation of Delaware Filed June 30, 1958, Ser. No. 745,568

10 Claims. (Cl. 307—57)

This invention relates to alternating current systems having a plurality of alternating current generators connected in parallel and more particularly to circuits for dividing the reactive and real loads between the generators. The present invention may be considered as an improvement upon the invention disclosed in my co-pending application Serial No. 574,823, filed March 29, 1956, now Patent No. 2,843,760 and the present application constitutes a continuation in part of said application Serial No. 574,823. The invention is particularly useful in connection with alternating current systems of multi-engined aircraft, but it is to be understood that the invention is adaptable to other uses and environments.

Modern multi-engined aircraft employ a plurality of generators connected in parallel and supplying common buses. Proper parallel operation of the generators requires that the total system load be divided equally among the parallel generators. The generators are driven by separate prime movers through constant speed drive devices, and the real load division is regulated through regulation of the generator speed. The reactive load division is accomplished by regulation of the excitation of the generators. Unless the rear and reactive loads on the several generators are properly regulated, undesirable transfer of load between generators takes place.

My co-pending application aforesaid discloses a polyphase alternating current generating system having a plurality of synchronous generators connected in parallel, each generator preferably having a regulating means responsive to a direct current input signal for controlling the operaiton of the generator, a current transformer connected so that the secondary of the transformer provides a resultant output voltage only when the current in the output phase to which the primary of the current transformer is connected differs from the current in the system to which the generator is connected, and a phase sensitive rectifying means for comparing the phase of the output voltage of the current transformers and the output voltage of a voltage transformer having its primary connected to the output of the generator. The phase sensitive rectifier provides direct current control signals in response to changes in the relationships of said voltages; these signals are utilized to regulate the generator.

System of this type operate satisfactorily with compartively simple and light static components, and the systems can be designed with the degree of sensitivity required to maintain the average load unbalance between the generators of a system less than the permissible average load unbalance specified by aircraft manufacturers and operators. However, it has been found that as the sensitivity of the load division circuit is increased to comply with the increasingly rigid requirements imposed upon aircraft electrical systems, cyclic disturbances in generator loading can be observed. Disturbances can occur by reason of an existing modulation of the bus voltage, a change in the speed of a prime mover, a transient in load current because of the switching of a load on the system or other similar causes. Speed or voltage modulation can be present in the system as a result of other than ideal regulation or asymmetry of the prime movers or the synchronous generators. Cyclic transfer of load between generators at undesirable levels can be brought about by any one or a combination of these causes.

The general object of the present invention is to provide circuits whereby cyclic disturbances in the system resulting from any of the above causes can be greatly reduced, if not entirely eliminated, and thus load transfer oscillations among the paralleled generators can be reduced to values which will not adversely affect the operation of the system. Another object is the provision of such circuits in which the load division circuits can be made highly sensitive so that the average load division between the generators can be maintained within narrow limits and at the same time cyclic or oscillatory transfer of load between generators can be kept at relatively low values or substantially eliminated.

Figure 2:
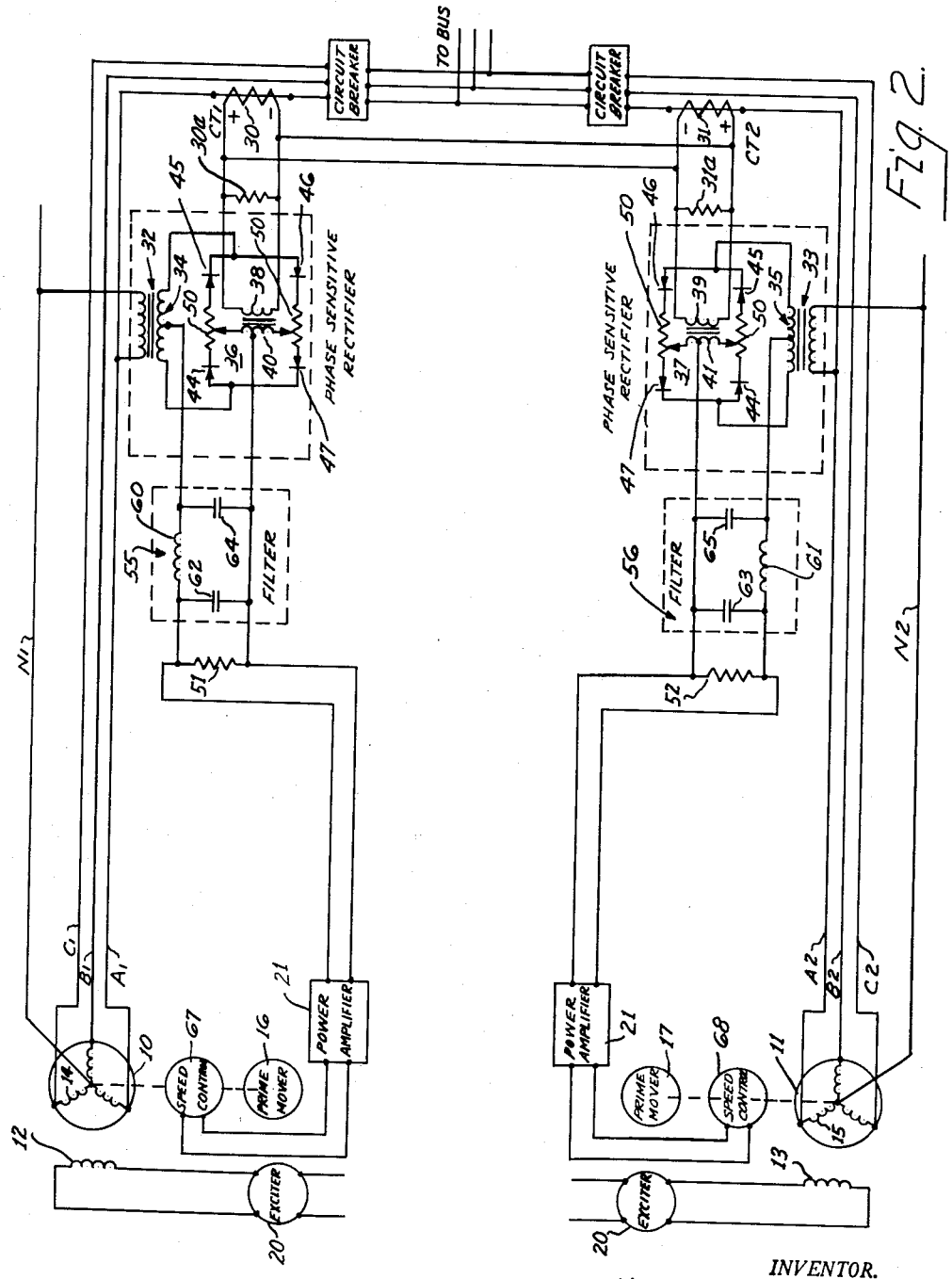

Other objects and advantages of the invention will become apparent from the following description of a preferred form thereof, reference being made to the accompanying drawings:

Figure 1 is a diagram of a three phase alternating current reactive load division system embodying a preferred form of the invention, and Figure 2 is a diagram of a similar system for division of the real load.

The drawing illustrates a system embodying two generators driven by separate prime movers, but it is to be understood that more than two generators can be employed if desire, in which case the circuits associated with each generator regulate the generator with respect to the average of all of the other generators; i.e., with respect to the common bus.

As shown in Figure 1, the basic reactive load division system is essentially the same as that disclosed in my aforesaid co-pending application. The generating system comprises two three-phase synchronous generators 10 and 11 which have their outputs connected in parallel. Corresponding phases of generators 10 and 11 are indicated by reference characters $A_1$, $B_1$ and $C_1$ and $A_2$, $B_2$ and $C_2$, respectively. The generators 10 and 11 have exciting windings 12 and 13 and armature windings 14 and 15, respectively. The generators are driven by prime movers 16 and 17, and the real power output of the generators may be controlled in any convenient manner by controllong the power input from the prime movers to the generators. The output voltage and the reactive loads of the generators are controlled by controlling the excitation of the field coils 12 and 13.

The excitation systems for the generators are substantially identical. Each excitation system comprises a direct current exciter 20 for energizing the field coil of the generator with which it is associated. The exciter 20 is excited by a power amplifier 21, and the output of the power amplifier is controlled by a reference voltage, a direct current voltage proportional to the output voltage of the generator with which it is associated and a direct current voltage proportional to the unbalance in the reactive load on the particular generator as compared to the reactive load of the system; in the present example this is the reactive load of the other generator. The reference voltage and the voltage proportional to the voltage output of the associated generator are connected to the input of the power amplifier in opposition to each other to provide voltage regulation. The reference voltage is supplied by a constant voltage source 22 energized from the output of the corresponding generator, the output of source 22 being connected across a resistor 22a in the input of the power amplifier 21. Constant voltage sources suitable for use with such generators are known to those skilled in the art and are not described in detail herein.

The power amplifier 21 is supplied with a direct current voltage proportional to the voltage output of its associated generator by rectifying the output of the generator. To accomplish this, a three-phase transformer 25 is provided; the primary of transformer 25 is connected to the output of the generator while the secondary is connected to a three-phase rectifier bridge 27. The output of the rectifier bridge is connected across a load resistor 28, and the voltage drop across the resistor 28 is connected to the input of the power amplifier 20 of the associated generator in such a manner as to oppose the reference voltage from the corresponding reference voltage source 22. As the output voltage of the associated generator increases, the resultant voltage applied to the input of the power amplifier 21 decreases because of the opposed connection between the output voltage of the rectifier 27 and the reference voltage, thus causing the excitation of the generators to decrease. The opposite action takes place upon a decrease in generator voltage.

A direct current signal proportional to reactive load unbalance is also applied to the input of each power amplifier 21 when the reactive load of its associated generator differs from the reactive load of the system. To this end, current transformers 30 and 31 are provided in phases $A_1$ and $A_2$ of generators 10 and 11, respectively. Voltage transformers 32 and 33, having their primaries connected across phases $B_1$ and $C_1$ and $B_2$ and $C_2$, respectively, are also provided. Transformers 32 and 33 have center tapped secondaries 34 and 35, respectively; these are connected to one of the inputs of phase sensitive rectifiers 36 and 37, respectively, as described below.

The secondaries of current transformers 30 and 31 are wound with respect to their primaries to give current polarities with respect to each other as indicated by the current polarity reference marks on the drawing. The secondaries are interconnected in series with additive polarity as shown. Resistors 30a and 31a are connected to the secondaries of the current transformers 30 and 31, respectively. With this connection, no voltage appears across either resistor 30a or resistor 31a unless an unbalance exists between the instantaneous currents in phases $A_1$ and $A_2$ and in the secondaries of the current transformers 30 and 31. Such an unbalance is present when the load between generators 10 and 11 is unbalanced. When such an unbalance exists, the resulting voltage is applied by means of transformers 38 and 39 having center tapped secondaries 40 and 41, respectively, to the other inputs of the phase sensitive rectifiers 36 and 37, respectively.

The phase sensitive rectifiers 36 and 37 are of the same construction, and in the drawing the same reference characters have been applied to the corresponding components of each. While other circuits could be employed, each rectifier preferably comprises a bridge having individual rectifying elements 44, 45, 46 and 47 in the respective legs thereof. The cathode of each rectifier element is connected to the anode of the following rectifier element when proceeding in one direction around the bridge. The voltage developed in the secondary 34 of the transformer 32 is connected across one diagonal of rectifier bridge 36, the connections being made between the rectifying elements 44 and 47 on one side and 45 and 46 on the other side. The voltage developed in the secondary 40 of the transformer 38 is connected across the other diagonal of the bridge 36, the connections being made through the movable contacts of the variable resistor 50. The center tap connection of the secondary 34 of the transformer 32 and the secondary 40 of the transformer 38 are connected to an output resistor 51 of the phase sensitive rectifier 36. Resistor 51 is connected in series with resistors 22a and 28 in the input circuit for the amplifier 21. Corresponding input connections in rectifier 37 are provided as shown in the drawing, the input voltages being derived from secondary 35 of transformer 33 and secondary 41 of transformer 39. The center taps of secondaries 35 and 41 are connected to a resistor 52 which corresponds to resistor 51 and is connected in series in the input circuit of the power amplifier 21 that is associated with generator 11.

As explained in greater detail in my aforesaid application Serial No. 574,823, the output of rectifier 36 depends upon the magnitude and phase relationship of the two input voltages to the rectifier. When the two input voltages to the rectifier 36 are 90° out of phase with each other, the rectifier has no output voltage; when the voltage inputs to the rectifier are in phase with each other, the voltage output of the rectifier 36 is at a maximum. In the same manner, the output of rectifier 37 depends on the magnitude and phase relationship of the two input voltages to it.

In the operation of the system, reactive load unbalance is sensed by resistors 30a and 31a. When the reactive load is shared equally by the two generators 10 and 11, no voltage appears across either resistor 30a or 31a because the secondaries of current transformers 30 and 31 are so interconnected that each supplies current to these resistors that is 180° out of phase with that supplied by the other. Accordingly, there is no input voltage across the one diagonal of the phase sensitive rectifier bridges 36 and 37, and no output voltage is produced by the rectifiers for load division regulation of the excitation of the two generators. However, if there is an unequal division of the reactive load, the secondaries of the current transformers 30 and 31 supply current to resistors 30a and 31a and voltages are developed across these resistors and their respective input transformers 38 and 39. This, as explained in my aforesaid application, produces output voltages from the phase sensitive bridges that result in the desired correction of the excitation of the respective generators being made by reason of the voltages appearing across the output resistors 51 and 52. The magnitude of the input voltages to the phase sensitive rectifiers and thus their output voltage for regulation is substantially proportional to the magnitude of the phase difference between the currents flowing through resistors 30a and 31a and produced by current transformers 30 and 31. This current is substantially proportional to the inequality of reactive load division between the generators.

The apparatus heretofore described is essentially identical with the apparatus of my aforesaid application Serial No. 574,823. As explained above, while this apparatus functions to maintain the average reactive load division between parallel generators within close limits, there are circumstances in which cyclic disturbances can occur in the system and these are particularly apt to occur when the load division circuit is made to be highly sensitive to obtain close control of the loads imposed on the generators. Load transfer oscillations between generators can take place, and these can reach magnitudes that exceed the allowable limits, even though the average real and reactive loads are divided substantially equally in a normal manner. The reason that oscillations take place appears to be that since the input signal for the reactive load division circuit is taken from the current transformers 30 and 31, any oscillation existing at the generator output because of non-ideal regulation or other similar factors produces a signal that is picked up by the phase sensitive rectifier and applied to the voltage regulators and power amplifiers 21. If the correcting signal is of proper phase shift, it opposes any oscillations existing at the generator output. However, the signal generated by the phase sensitive rectifiers 36 and 37 can occur in a frequency range where the phase shift through the power amplifiers 21, the exciters 20 and the generators 10 and 11 can be in the neighborhood of 180°. Phase shifts of this character occur because of the time constants of the various elements and are unlikely to occur in machines of conventional design for aircraft power systems at frequencies of less than five cycles per second. If such a phase shift should occur, the first correcting signal from the phase sensitive amplifiers 36 and 37 would produce a signal at the generator output which would be fed back through the reactive load division circuit in amplified form and come back into the voltage regulator input with such a phase shift as to reinforce existing oscillations. Under these circumstances, the load division circuit would be unable to prevent undesirable oscillatory load transfer between parallel connected generators.

According to the present invention, this difficulty is is eliminated by decreasing the gain of the reactive load division circuit in the frequency range where the phase shift through the power amplifiers 21, the exciters 20 and the generators 10 and 11 approaches 180° without otherwise reducing the sensitivity of the control. This is accomplished by incorporating a low pass filter in each circuit between the phase sensitive rectifier and the power amplifier and preferably between the sensitive rectifiers 36 and 37 and their associated output resistors 51 and 52. These filters are indicated at 55 and 56, respectively, in the drawing. Filter 55 comprises an inductance 60 connected in series with one of the output leads of the phase sensitive rectifier 36 with capacitors 62 and 64 connected across the output leads. Filter 56 is substantially identical and includes an inductance 61 and capacitors 63 and 65. In a typical aircraft alternating current system embodying 400 cycle alternators, good results have been obtained with filters made up of inductances 60 and 61 having an inductance of 8.6 henries and 1100 ohms resistance with the capacitors 62, 63, 64 and 65 each having a capacity of 50 microfarads. These filters were used in conjunction with load resistors 51 and 52 having resistances of 5,000 ohms.

Those skilled in the art will appreciate that other combinations of resistances, capacitances and inductances giving similar low pass filter characteristics can be used. If desired, a resistance-capacitance filter can be employed without any substantial inductance. It is also to be noted that the input voltages to the power amplifiers do not have to be combined in the manner shown, which constitutes a series connection. One or more of the input signals, for example, might be applied in parallel to the input circuit of the power amplifier. This depends upon the circuit designer's choice as to the impedance levels of the different circuit elements.

The same general type of circuit can be employed in controlling the division of the real load between the generators and in preventing undesirable oscillations in real load transfer. The application of the invention to such a control is shown in Figure 2 in which the same reference characters as used in Figure 1 have been applied to corresponding elements. In this figure the transformers 32 and 33 have their primaries connected between passes $A_1$ and $A_2$, respectively, of generators 10 and 11 and the ground or neutral circuits N of these generators. The output of the power amplifiers 21, instead of being employed to control the excitation of the exciters as in Figure 1, is utilized to control speed control devices 67 and 68 interposed between the prime movers 16 and 17 and the generators 10 and 11. Speed controls 67 and 68 may be of known construction such as the hydraulic drives presently employed in aircraft generator drives. Such hydraulic drives may be controlled by electrical signals through known servo mechanisms. The remaining components of the circuits are substantially identical with those previously described except that the generator voltage control elements 22, 22a, 25, 27 and 28 are omitted and the primaries of transformers 32 and 33 are connected between phases $A_1$ and $A_2$ and the neutrals $N_1$ and $N_2$ of the generators 10 and 11. Since the current transformers 30 and 31 also have their primaries in phases $A_1$ and $A_2$, the circuit senses inequalities in real load division. The low pass filters 55 and 56 prevent the development of oscillatory load transfer between the generators while permitting the phase sensitive rectifiers 36 and 37 to effect the desired close control of the real load division. Obviously, both the real and reactive load divisions in a given generator system can be controlled by a system embodying elements of both Figures 1 and 2.

From the foregoing, it will be evident that the invention provides a regulating system for parallel connected alternating current generators by means of which the generators can be controlled to maintain substantially equal load division between the generators. The system can be made to control the average load division between the generators with a high degree of accuracy and at the same time avoid undesirable oscillatory load transfer between the generators. The system may be adapted to control reactive load division, real load division, or both.

Various changes in the preferred forms of the invention described herein will be apparent to those skilled in the art. It is to be understood, therefore, that the preferred forms disclosed herein are given merely by way of example and that the scope of the invention is defined by the appended claims.

I claim:

1. A generating system embodying a plurality of alternating current generators connected in parallel, at least one of said generators having a regulating means responsive to an input signal for controlling the operation of the generator, circuit means associated with the output of the generator and with the output of the system to which the generator is connected to provide a resultant output only when the output of the generator differs from the output of the system to which the generator is connected, and a low pass filter connected into the output of said circuit means between said circuit means and said regulating means for preventing oscillatory transfer of load between said generator and the system to which it is connected.

2. A generating system embodying a plurality of alternating current generators connected in parallel, at least one of said generators having a regulating means responsive to an input signal for controlling the operation of the generator, circuit means associated with the output of the generator and with the output of the system to which the generator is connected to provide a resultant output only when the output of the generator differs from the output of the system to which the generator is connected, amplifying means for amplifying the signal produced by said circuit means and a low pass filter connected into the output of said circuit means between said circuit means and said amplifying means for preventing oscillatory transfer of load between said generator and the system to which it is connected.

3. A generating system embodying a plurality of alternating current generators connected in parallel, at least one of said generators having a regulating means responsive to an input current for controlling the excitation of said one generator, circuit means associated with the output of said one generator and with the output of the system to which said one generator is connected to provide a resultant output voltage only when the reactive load on said one generator differs from the load on another generator in the system to which said one generator is connected, amplifying means for amplifying the signal produced by said circuit means and supplying said signal to said regulating means and a low pass filter connected into the output of said circuit means between said circuit means and said amplifying means for preventing oscillatory transfer of load between said one generator and said other generator.

4. A generating system embodying a plurality of alternating current generators connected in parallel, separate prime movers for driving said generators, at least one of said generators having a regulating means responsive to an input current for controlling the speed of said one generator, circuit means associated with the output of said one generator and with the output of the system to which said one generator is connected to provide a resultant output voltage only when the real load on said one generator differs from the load on another generator in the system to which said one generator is connected, amplifying means for amplifying the signal produced by said circuit means and supplying said signal to said regulating means and a low pass filter connected into the output of said circuit means between said circuit means and said amplifying means for preventing oscillatory transfer of load between said one generator and said other generator.

5. A generating system embodying a plurality of alternating current generators connected in parallel, at least one of said generators having a regulating means responsive to a direct current input signal for controlling the operation of said generator, a current transformer for said generator having its primary connected to one of the output phases thereof, a voltage transformer for said generator having its primary connected to the output thereof, circuit means associated with the secondary of said current transformer so as to provide a resultant output voltage only when the current in the output phase to which the primary of the current transformer is connected differs from the current in the system to which the generator is connected, phase sensitive rectifying means for comparing the phase of the output voltage of the voltage transformer and the resultant output voltage of said current transformer and for providing a direct current control signal in response to a phase change between said voltages, means connecting said direct current control signal to the regulating means of said generator and a low pass filter interposed in the circuits between said phase sensitive rectifying means and said regulating means.

6. A generating system embodying a plurality of alternating current generators connected in parallel, at least one of said generators having a regulating means responsive to a direct current input signal for controlling the operation of said generator, a current transformer for said generator having its primary connected to one of the output phases thereof, a voltage transformer for said generator having its primary connected to the output thereof, circuit means associated with the secondary of said current transformer so as to provide a resultant output voltage only when the current in the output phase to which the primary of the current transformer is connected differs from the current in the system to which the generator is connected, phase sensitive rectifying means for comparing the phase of the output voltage of the voltage transformer and the resultant output voltage of said current transformer and for providing a direct current control signal in response to a phase change between said voltages, amplifier means for amplifying said direct current control signal, means connecting the output of said amplifying means to the regulating means of said generator, and a low pass filter interposed in the circuits between said phase sensitive rectifying means and said amplifier.

7. In a generating system, first and second synchronous three-phase generators connected in parallel, individual regulating means for each generator responsive to a direct current control signal for controlling the excitation of each of the generators, a current transformer for each generator having its primary connected in one of the output phases of the corresponding generator, a voltage transformer for each generator having its primary connected across the other two phases of the corresponding generator, phase sensitive rectifying means for each generator comparing the output of the corresponding current transformer and voltage transformer and for providing a direct current output signal dependent on the phase difference between the output of the current transformer and the voltage transformer and having a magnitude also dependent on the magnitude of the output from the current transformer, means interconnecting the secondaries of said current transformer so as to provide a resultant output voltage therefrom only when the currents in the phases of the generator in which the current transformers are connected are unbalanced, means connecting the output of each of said phase sensitive rectifying means to the corresponding regulating means, and each connecting means including an amplifier and a low pass filter interposed between the phase sensitive rectifier and the amplifier.

8. In a regulating system for paralleled three-phase synchronous generators, regulating means responsive to a direct current signal for regulating the load on a generator, first and second transformers connected to the output of the generator for providing first and second alternating voltage signals having a phase relationship indicative of the load on the generator, a rectifier bridge comprised of a plurality of rectifying elements each having its cathode connected to the anode of the following element when proceeding in one direction about the bridge, each of said transformers having center-tapped secondary coils, means connecting one of the secondary coils across one diagonal of said bridge, means connecting the other secondary coil across the other diagonal of the bridge, an output resistor connected between the center tap connections of said coils, and means including a low pass filter for connecting the voltage drop across said resistor to the input of said regulating means.

9. In a regulating system for paralleled three-phase synchronous generators, regulating means responsive to a direct current signal input for controlling the excitation of a generator in parallel, a current transformer in one of the output phases of the generator for providing a first alternating current signal of a voltage dependent upon the line current of the generator, a first voltage transformer connected across the other two output phases of the generator, a second voltage transformer having its primary connected in series with the secondary of said current transformer, each of said voltage transformers having a center-tapped secondary coil, a rectifier bridge comprised of a plurality of rectifying elements each having its cathode connected to the anode of the following rectifying element when proceeding in one direction around the bridge, means connecting the secondary coils of said voltage transformers across different diagonals of said bridge, an output impedance connected between the center tap connections of the secondary coils of said voltage transformer, and means including a low pass filter and an amplifier connecting the voltage drop across said output impedance to the input of said regulating means.

10. In a generator system, first and second three-phase synchronous generators having their outputs connected in parallel, regulating means for each generator responsive to a direct current input signal for controlling the load of the corresponding generator, a current transformer and a voltage transformer for each generator and connected to the output of the corresponding generator to provide first and second alternating current voltages having a phase relationship dependent on the load of the generator to be controlled, each of said voltage transformers having a center-tapped secondary coil, means interconnecting said current transformers so as to provide a first voltage only when the line current of one generator is different from the average line current, a rectifying bridge for each generator comprised of a plurality of rectifying elements each having its cathode connected to the anode of the following rectifier element when proceeding around the bridge in one direction, an input transformer for each bridge having its primary coil connected to said current transformers and a center-tapped secondary coil, means connecting the secondary coils of said input transformers across one diagonal of the corresponding bridge, means connecting the voltage outputs from the secondary coils of said voltage transformers across the other diagonal of the corresponding rectifier bridge, an output impedance for each bridge connected between the center tap connections of the secondary coils of the voltage transformers connected to the particular bridge, and means including a low pass filter and an amplifier for connecting the voltage drop across each of said output impedances to the input of the respective regulating means.

References Cited in the file of this patent

UNITED STATES PATENTS

| | | |
|---|---|---|
| 2,834,892 | Martin | May 13, 1958 |
| 2,839,694 | Fairweather et al. | June 17, 1958 |
| 2,843,760 | Kahle | July 15, 1958 |

UNITED STATES PATENT OFFICE
CERTIFICATION OF CORRECTION

Patent No. 2,972,058                            February 14, 1961

Hermann A. Kahle

It is hereby certified that error appears in the above numbered patent requiring correction and that the said Letters Patent should read as corrected below.

Column 2, line 34, for "desire" read -- desired --; column 5, line 62, for "passes" read -- phases --.

Signed and sealed this 25th day of July 1961.

(SEAL)
Attest:

ERNEST W. SWIDER                            DAVID L. LADD
Attesting Officer                              Commissioner of Patents